United States Patent Office  3,437,652
Patented Apr. 8, 1969

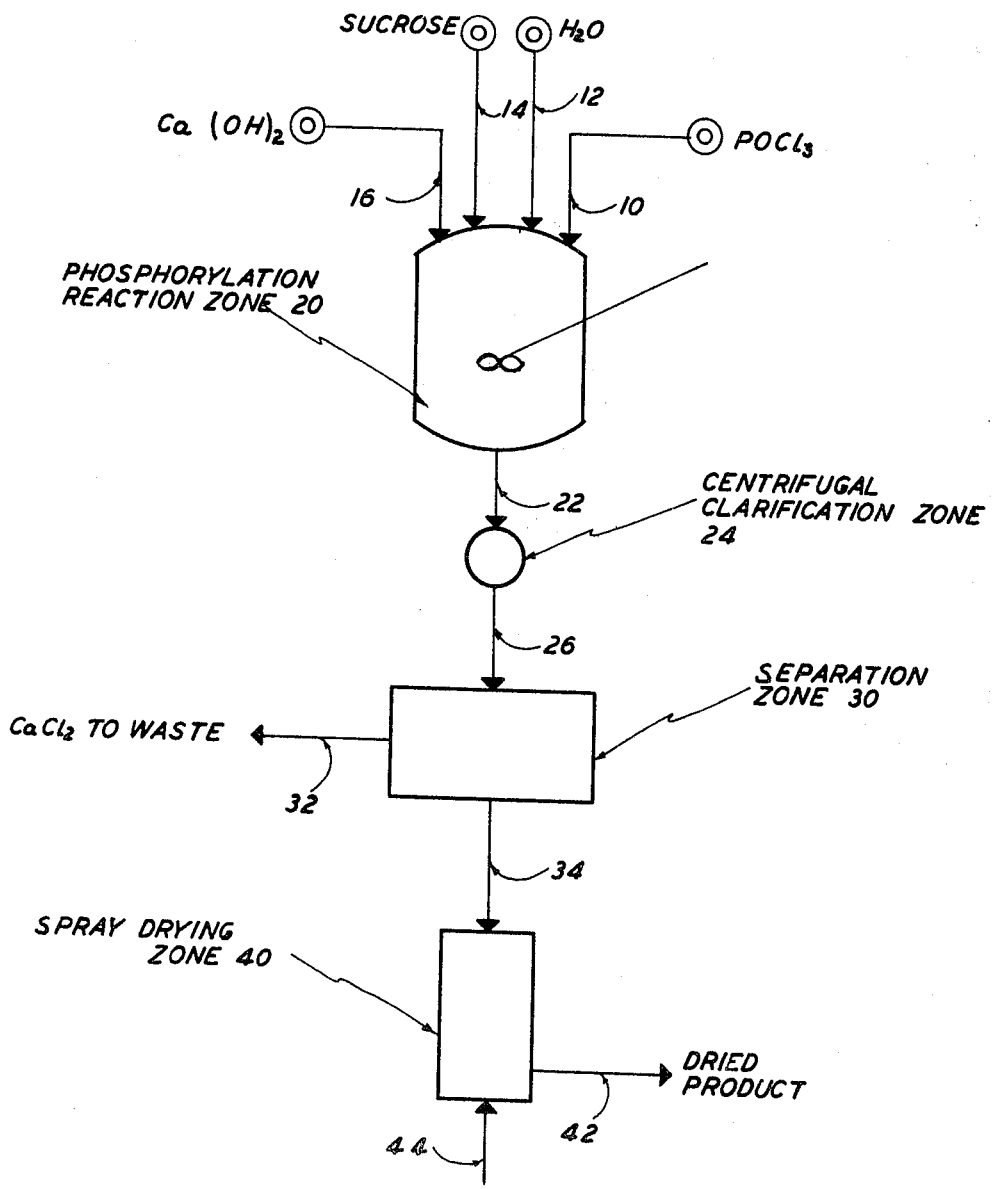

3,437,652
PROCESS FOR PREPARING PHOSPHATE ESTERS OF CARBOHYDRATES
Ramsey G. Campbell, Berkeley, Charles C. Oldenburg, Mill Valley, and Raymond A. Simone, Walnut Creek, Calif., assignors, by mesne assignments, to The Colonial Sugar Refining Company Limited, Sidney, New South Wales, Australia, a corporation of New South Wales
Filed Feb. 2, 1967, Ser. No. 613,619
Int. Cl. C07f 9/08; C07c 47/18
U.S. Cl. 260—234       6 Claims

ABSTRACT OF THE DISCLOSURE

A method of phosphorylating a sugar, such as sucrose, by (1) providing a reaction solution of (a) a sugar (b) water, and (c) calcium oxide, calcium hydroxide, or calcium carbonate, (2) introducing thereto phosphorus oxychloride in the absence of a protectant, e.g. trichloroethylene, to improve the yield (3) reacting these materials at between 0° to about 20° C. and (4) recovering the corresponding calcium sugar phosphate containing material essentially free of calcium chloride in improved yields.

---

Calcium sugar phosphates, and in particular calcium sucrose phosphate, have been found to be useful as a cariostatic agent, as a plant and animal nutrient, and for various other uses including coating of dried cereals. In the past calcium sucrose phosphate was made by the phosphorylation of sucrose in the presence of lime and a sufficient amount of water as a diluent to prevent viscosity buildup of the solution. The phosphorylation was always carried out via introduction of phosphorous oxychloride ($POCl_3$) in a suitable guard or protectant such as trichloroethylene (as disclosed in copending application Ser. No. 414,074 filed Nov. 27, 1964, now U.S. Pat. No. 3,375,168 granted on Mar. 26, 1968) or in chloroform such as is disclosed in German Patent 247,809. After sufficient reaction time had been allowed in order to form the calcium sucrose phosphate product, reaction mixture was clarified by settling or filtration or both and the calcium sucrose phosphate product was recovered by the introduction of ethanol which precipitates the calcium sucrose phosphate. The solid material was then dried in order to remove ethanol and water. In the above-identified copending application, it is disclosed that the product of the process involves a complex association of the organic calcium sucrose phosphate component and the inorganic calcium phosphate component. While the product of the prior process is highly satisfactory and useful as mentioned above, the product produced by such processes is expensive due to certain inherent inefficiencies in the prior processing methods. It is therefore the principal object of the present invention to overcome and eliminate the difficulties inherent in the prior art and methods of making calcium sugar phosphates and to provide improved methods for carrying out the various individual unit operations including phosphorylation, clarification, and drying, as well as to provide a new and useful process which involves a combination of the various unit operations.

Another object of the present invention is to provide a novel method for the phosphorylation of sugar, e.g. sucrose, in greater yields and a more economically practicable manner.

Another object of the present invention is to provide an improved method of clarifying the product of the reaction step in an economically practical manner.

Another object of the present invention is to provide a novel and economically practicable method of drying a calcium sugar phosphate containing product.

Another object of the present invention is to provide a novel integrated process for the production of calcium sugar phosphates.

Other objects and advantages inherent in the present invention will become apparent from the following description and disclosure.

These and other objects are generally accomplished in accordance with the present invention by providing an aqueous solution containing essentially a sugar and a calcium oxy-compound selected from the group consisting of calcium oxide, calcium hydroxide, and calcium carbonate at a relatively low tempertaure, preferably between about 0 and about 20° C., and slowly adding thereto a liquid consisting essentially of $POCl_3$. It has been surprisingly found that when the $POCl_3$ is introduced in this manner without the presence of chlorinated solvent hereinbefore throught necessary to prevent premature decomposition of the $POCl_3$ or the occurrence of undesirable side reactions, unexpectedly high yields of the desired phosphorylation reaction products are obtained. The observed increase in yield when $POCl_3$ is introduced alone is about 10% compared to the case where $POCl_3$ is introduced dissolved in an equal amount of trichloroethylene solvent. The $POCl_3$ is preferably added slowly while maintaining the temperature of the reacting bath at between about 0 and about 20° C. Agitation is preferably provided in order to maintain the solution in a homogeneous condition and to provide good heat transfer. Agitation is preferably continued until the reaction has reached the desired degree of completion. At completion the slurry should have a pH preferably about 9 or 10 at which time the reaction mass is discharged from the reactor and passed to a suitable clarification zone.

In the practice of the present invention, it has been discovered that the aqueous phosphorylation reaction product made without the presence of a chlorinated solvent such as trichloroethylene, cannot be satisfactorily clarified by the conventional filtration methods. The addition of carbon dioxide, heating to an elevated temperature about 85° C., and acidification to a pH of about 7 fails to enhance satisfactory clarification of the product made in this manner. It has been found that satisfactory clarification, which involves chiefly the removal of suspended solid material which appears to form during the phosphorylation reaction, is achieved by passing the phosphorylation reaction product into a suitable centrifugation zone and clarifying the material therein to a degree which is dependent upon feed rate and centrifugal speed. Satisfactory clarification has been achieved in a Sharples super solid bowl centrifuge at speeds of 24,000 r.p.m. at a feed rate of 200 to 300 milliliters per minute. Calcium sugar phosphate containing products is thereafter recovered at this point by any suitable method which includes ethanol precipitation and washing or evaporation to dryness. Since the phosphorylation reaction solution contains a substantial percentage of calcium chloride, which if not removed, makes the product deliquescent, the removal of calcium chloride during the recovery step in practicable manner is of critical importance to the process. In accordance with the present invention we have found that the calcium sugar phosphate product can be recovered in commercially practicable manner by the introduction of ethanol to the phosphorylation reaction solution to precipitate calcium sucrose phosphate. The precipitate or crude product contains a substantial percentage of calcium chloride. The crude product is then counter-currently leached with ethanol in a suitable number of contact stages, preferably at least about four stages to remove essentially all of the chloride. It has been found that chloride concentration of the finished calcium sucrose phosphate product can be reduced through the process of counter-flow leaching in accordance with the present invention to less than about 0.5% by weight. The phrase "to remove essentially all of the chloride" means removal of sufficient chloride to permit recovery of a non-deliquescent product. Other highly satisfactory methods of recovering a suitable product essentially free of calcium chloride include dialysis and electrodialysis which are disposed in the two copending applications of Oldenburg and of Campbell and Oldenburg, respectively, filed herewith. Calcium sugar phosphate product from which essentially all of the chloride has been removed, contains a substantial percentage of water and in accordance with the conventional methods of calcium chloride recovery contains as high as 40 weight percent ethanol. This material must be dried and the alcohol removed in order to provide a suitable product for use.

It has been found in accordance with the practice of the present invention, that a satisfactory product can be safely and economically produced by introducing wet calcium sugar phosphate containing product into a spray drying zone in which the product is dispersed by suitable means and dried by contact with heated air. The achievement of satisfactory spray drying of calcium sugar phosphate containing product is surprising since sucrose is difficult to recover in this manner. For a better understanding of the process of the present invention, reference is now made to the figure of the drawing which is a diagrammatic illustration of one embodiment of the process of the present invention.

Referring to the drawing, the suitable phosphorylation reaction zone 20 is provided which preferably comprises a stirred reaction vessel adapted with suitable cooling means (not shown) in order to maintain the temperature of the reaction at the desired level. The reaction in the phosphorylation zone can be carried out in either a batch or continuous manner. In a batch operation, calcium hydroxide, for example, is introduced into zone 20 via line 16, sucrose, for example, via line 14, and the desired quantity of water to maintain the reaction at the desired viscosity is introduced via line 12. When a satisfactory mixture of the three aforementioned constituents has been achieved, a liquid consisting essentially of phosphorous oxychloride is added to the reaction zone via line 10 at a slow rate with cooling and agitation such that the temperature of the reaction does not preferably exceed about 20° C. It is noted that the phrase "consisting essentially of phosphorus oxychloride" is intended to exclude the presence of a protectant such as the chlorinated solvents hereinbefore employed. As disclosed in copending application 262,230, now abandoned, the relative proportions of sugar, phosphorus oxy-chloride, and calcium oxy-compound are preferably stoichiometric.

When the reaction in zone 20 has proceeded to the desired degree of completion, the resulting turbit product solution is withdrawn via effluent line 22 to centrifugal clarification zone 24. In zone 24 the solution is clarified by centrifugation at relatively high speeds, e.g. about 24,000 r.p.m., which has been found satisfactory to clarify the solution. Such treatment separates suspended solids resulting in a clear product solution. The clarified solution is withdrawn from the centrifugal clarification zone 24 via line 26 and introduced to suitable separation zone 30. Zone 30 represents any suitable method of removal of calcium chloride from the phosphorylation reaction solution, including ethanol precipitation and leaching by either batch or continuous counterflow methods, dialysis as well as electrodialysis. Calcium chloride removed from the phosphorylation product is withdrawn in line 32 and passed to waste.

The refined phosphorylation product containing calcium sucrose phosphate (in complex association with inorganic calcium phosphate as defined in copending application Ser. No. 414,074 hereinabove referred) is withdrawn from zone 30 via line 34. The reaction product at this point can be concentrated to remove liquid material at this point or can be passed directly to a suitable drying zone such as spray drying zone 40 shown in the figure. If ethanol is present, it is preferable to remove this by evaporation before spray drying. In the spray drying zone drying air is introduced via line 44 in a manner such that it flows in co-current contact with the with the refined phosphorylation product which is distributed by suitable means in the upper portion of zone 40 e.g., a header containing a foraminous plate at the bottom thereof. Product dried in this manner is free flowing and is withdrawn to storage via line 42.

Reference is now made to numerical examples of operation which should not be construed as unduly limiting of the invention.

Example 1

This example illustrates the unexpected improvement in yield which is obtained by carrying out the phosphorylation reaction by the introduction of a liquid consisting essentially of $POCl_3$ as compared with prior methods wherein $POCl_3$ was introduced in a chlorinated solvent such as trichloroethylene.

In this example the reactor was an agitated stainless steel vessel immersed in a Dry Ice-isopropanol bath. Refined cane sugar in the amount of 3.64 moles was dissolved in 623 milliliters of hot water which was then cooled to 25° C. A slurry containing 8.89 moles of calcium hydroxide in 3,220 milliliters of water was then prepared and transferred into the reactor. Agitation of the reactor was begun and the sugar solution was then transferred thereto. The resulting slurry was then cooled to 5° C. $POCl_3$ liquid in the amount of 537 g. (3.5 moles) was then added to the agitated reaction mass over a period of about two hours while maintaining the temperature between 3 to 7° C. Upon completion of the $POCl_3$ addition, the cooling bath was removed and agitation of the mass was continued for about one hour. The pH of the slurry was checked and found to be about 9 to 10, at which time the mass was discharged and weighed. In a related experiment, 537 grams (3.5 moles) of $POCl_3$ were dissolved in an equal weight of trichloroethylene. The trichloroethylene-$POCl_3$ mixture was then added to the reaction mass under the same procedure as described above. Each product solution was recovered in the same manner by ethanol precipitation and repeated ethanol leachings. It was found that the yield of the desired product was about 10% higher in the case where $POCl_3$ was added alone as compared with the case where a chlorinated solvent was employed. Comparative yield figures are shown below in Table 1.

TABLE 1

Pounds of phosphate containing product per pound of sucrose on a dry basis

TCE used _____ 0.79
TCE not used _____ 0.87

The electrophoresis analysis of the products prepared in this manner is shown below in Table 2.

TABLE 2

|  | Ca, percent | P total, percent | P inorg., percent | $CaCl_2$ |
|---|---|---|---|---|
| TCE used | 12.1 | 9.4 | 2.8 | 0.55 |
| TCE not used | 10.6 | 9.1 | 2.0 | 0.55 |

Examples 2–15

These examples, which are summarized in Table 3, below, were carried out in a two-liter, four-neck, indented flask equipped with a stirrer, thermometer, and a 125 ml. cylindrical dropping funnel.

TABLE 3.—DATA AND RESULTS OF PHOSPHORYLATION PRODUCT REACTION STUDIES

| Run No | 2 | 3 | 4 | 5 | 6 | 7 | 8 | 9 | 10 | 11 | 12 | 14 | 15 |
|---|---|---|---|---|---|---|---|---|---|---|---|---|---|
| Reaction conditions: | | | | | | | | | | | | | |
| Lime | SSC | SSC | SSC | A.R. | A.R. | A.R. | A.R. | A.R. | A.R. | A.R. | A.R. | A.R. | A.R. |
| Sugar | (1) | (1) | (2) | (2) | (2) | (2) | (3) | (3) | (3) | (3) | (3) | (2) | |
| Lime/sugar, gm./gm | 0.530 | 0.600 | 0.700 | 0.530 | 0.700 | 0.600 | 0.600 | 0.600 | 0.600 | 0.600 | 0.400 | 0.600 | 0.600 |
| POCl₃ addition time, hrs | 1.6 | 2.7 | 1.4 | 1.9 | 1.8 | 6.0 | 1.8 | 2.1 | 1.6 | 1.2 | 1.3 | 2.2 | |
| Reaction temp., °C | 3-5 | 3-5 | 3-5 | 3-5 | 3-5 | 3-5 | 3-5 | 3-5 | 3-5 | 3-5 | 3-5 | 15-20 | −10, +5 |
| (POCl₃/lime), gm./gm | 0.631 | 0.824 | 0.638 | 0.830 | 0.819 | 0.837 | 0.844 | 0.838 | 0.861 | 0.834 | 0.880 | 0.814 | 0.860 |
| Solids removed, percent reaction mix | 7.3 | 2.8 | 10.4 | 2.6 | 4.1 | 4.5 | 4.2 | 1.1 | 4.6 | 1.1 | 1.6 | 1.5 | 1.1 |
| Solids in clarified mix, percent | 37.5 | 41.4 | 38.6 | 36.8 | 36.8 | 37.7 | 40.4 | 40.2 | 40.3 | 38.9 | 35.6 | 39.1 | 41.5 |
| Percent CaCl₂ in clarified mix | 8.21 | 10.63 | 9.46 | 9.55 | 10.72 | 10.40 | 10.75 | 10.62 | 10.63 | 10.17 | 7.90 | 10.1 | 11.0 |
| Density, gm./m | | | | 1.241 | 1.249 | | 1.263 | 1.265 | 1.267 | 1.252 | 1.221 | 1.251 | 1.276 |
| Analyses: | | | | | | | | | | | | | |
| Basis: Dry and CaCl₂ Free: | | | | | | | | | | | | | |
| P_T, percent | 5.25 | 6.44 | 6.06 | 6.61 | 7.9 | 7.15 | 6.77 | 4.88 | 3.99 | 6.75 | 5.43 | 6.59 | 6.84 |
| P_I, percent | 0.89 | 1.34 | 1.29 | 1.48 | 2.08 | 1.63 | 1.41 | 1.45 | 1.40 | 1.54 | 0.815 | 1.84 | 1.72 |
| Sucrose, percent | 16.1 | 13.9 | 11.7 | 18.3 | 13.9 | 15.7 | 18.9 | 21.3 | 16.2 | 22.7 | 33.5 | 29.6 | 22.6 |
| Basis: Dry, CaCl₂ free, and sucrose free: | | | | | | | | | | | | | |
| P_T, percent | 6.26 | 7.47 | 6.86 | 8.1 | 9.17 | 8.5 | 8.35 | 6.23 | 4.76 | 8.73 | 8.04 | 9.36 | 8.84 |
| P_I, percent | 1.07 | 1.55 | 1.47 | 1.82 | 2.42 | 1.93 | 1.74 | 1.84 | 1.68 | 1.98 | 1.23 | 2.62 | 2.22 |
| Ca, percent | 6.67 | 8.61 | 7.76 | 8.95 | 10.62 | 9.45 | 8.98 | 7.55 | 9.30 | 9.92 | 7.7 | 10.5 | 8.87 |
| Sucrose conversion, percent | 79.1 | 79.0 | 83.7 | 74.8 | 79.7 | 78.1 | 73.0 | 71.4 | 77.8 | 66.2 | 56.0 | 56.7 | 63.1 |
| Dry CaCl₂ free, sucrose free: | | | | | | | | | | | | | |
| Product/sugar converted, gm./gm | 1.39 | 1.64 | 1.49 | 1.51 | 1.57 | 1.50 | 1.59 | 1.48 | 1.49 | 1.75 | 1.56 | 1.81 | 1.76 |
| P_T/P_I | 5.86 | 4.82 | 4.69 | 4.46 | 3.79 | 4.42 | 4.80 | 3.37 | 2.83 | 4.49 | 6.55 | 3.49 | 3.98 |

¹ C & H refined.
² C & H liquid, 66.5% sucrose.
³ Spreckels, liquid, 66.5% sucrose.

Example 16

Phosphorylation reaction mixes prepared in a 30 gallon laboratory reactor in accordance with the procedure stated in Example 1, were passed to a high speed centrifugal clarifier operated at about 24,000 r.p.m. and clarified at the rate of 4 gallons per hour. This operation removed most of the suspended solids. The solids removed by centrifugation amounted to about 0.3 weight percent of the feed when reagent grade lime was used. When commercial lime was used, the bowl residue was about 1 weight percent of the feed. The use of a Sharples, solid bowl super centrifuge gave satisfactory results in these experiments.

Example 17

In order to determine the suitability of products made in accordance with the process of the present invention for alcohol removal by boiling prior to spray drying the hydrolytic stability of two samples of a product was investigated by holding a 35% aqueous solution thereof at 100° C. for 6 hours. Analyses of the product (hydrated basis) before and after hydrolytic exposure are given below:

| | Original analysis | Analysis after hydrolytic exposure |
|---|---|---|
| Sample 1: | | |
| Ca, percent | 11.6 | 12.2 |
| Total P, percent | 8.33 | 8.83 |
| Inorganic P, percent | 2.48 | 2.80 |
| Sample 2: | | |
| Ca, percent | 10.3 | 11.4 |
| Total P, percent | 7.80 | 8.39 |
| Inorganic P, percent | 2.25 | 2.18 |
| Cl, percent | 0.5 | 0.48 |

The above results indicate no severe breakdown of product under hydrolytic exposure.

Example 18

Spray drying tests were run on aqueous refined phosphorylation product solutions, e.g., such as is described as Sample 1, Example 17. The equipment used was a Nerco-Niro portable spray dryer that used electrically heated air. An aqueous solution containing 33% product dried easily giving a particle size averaging about 10 microns. Oven dried product gave a less desirable product averaging about 3 microns. Satisfactory inlet and outlet air temperatures were 645° F. and 180° F. Since refined product normally hydrates to approximately 12 to 14% even after being completely dehydrated, no attempt was made to completely dry the product by spray drying. The product effluent from the dryer contained about 12% moisture. There was no detectable loss of product in the exhaust air. Drying tests with a solution containing about 50% product gave a larger particle size, averaging about 15 microns. However, a small ring of super-cooled, gummy product formed on the dryer wall in the same plane as the atomizer wheel, indicating that the atomized solution was not sufficiently dehydrated in the dryer air space before hitting the wall of the dryer.

Having thus described the invention with reference to specific examples thereof, many modifications and alterations will become apparent to those skilled in the art. It should be understood that while the present invention is described with particular reference to the production of calcium sucrose phosphate and complexes thereof, that the process of the present invention can be applied to the production of calcium sugar phosphates in general. Representative of other sugar materials which can be treated in accordance with the present phosphorylation process include galactose, arabinose, ribose, xylose, maltose, lactose, raffinose and glucose. It should be likewise understood that the process of the present invention can be carried out by employing stoichiometric quantities of lime, POCl₃ and sugar as set forth in copending application 262,230, filed Mar. 1, 1963, now abandoned, or by employing a stoichiometric excess of an acid acceptor such as is disclosed in German Patent 247,809.

What is claimed is:

1. A process which comprises providing a reaction solution containing a sugar, water, a calcium oxy-compound selected from the group consisting of calcium oxide, calcium hydroxide and calcium carbonate maintained at a temperature between about 0° C. and about 20° C. in an agitated reaction zone and introducing thereto liquid phosphorus oxychloride free from any protectant solvent including chlorinated solvents, reacting said materials for a period of time sufficient to permit the desired degree of conversion of sugar to the corresponding sugar phosphate, clarifying the resulting reaction solution in a centrifugation zone, separating calcium chloride from the thus clarified solution, spray drying the thus purified solution to obtain a calcium sugar phosphate containing solid product.

2. A method of phosphorylating a sugar which comprises providing a reaction solution containing the sugar, water, and a calcium oxy-compound selected from the group consisting of calcium oxide, calcium hydroxide and calcium carbonate and introducing thereto liquid phosphorus oxychloride free from any protectant solvent including chlorinated solvents, reacting said materials and recovering from the phosphorylation reaction solution the corresponding calcium sugar phosphate containing material in improved yields.

3. The method of claim 2 in which said sugar comprises sucrose.

4. Method of claim 2 in which said sugar is selected from the group consisting of sucrose, galactose, arabinose, ribose, xylose, maltose, lactose, raffinose, and glucose.

5. The method of claim 2 in which said reaction temperature is maintained between about 0 and about 20° C.

6. The method of claim 2 wherein recovering from the phosphorylation reaction solution the corresponding calcium sugar phosphate containing material in improved yields includes clarifying the phosphorylation reaction solution, separating calcium chloride from the clarified solution, introducing the solution containing the calcium sugar phosphate essentially free of calcim chloride into a spray drying zone, distributing said solution in a current of relatively warm gaseous material and recovering a solid, free-flowing, calcium sugar cointaining product from said spray drying zone.

References Cited
UNITED STATES PATENTS 3,375,168   3/1968   Curtin et al. _____ 260—234

FOREIGN PATENTS 247,809   6/1912   Germany.
1,351,134   12/1963   France.

LEWIS GOTTS, *Primary Examiner.*

J. R. BROWN, *Assistant Examiner.*